(12) United States Patent
Chung (10) Patent No.: US 7,248,083 B2
(45) Date of Patent: Jul. 24, 2007

(54) METHODS AND SYSTEMS FOR DECREASING TRANSMISSION TIMING VARIATIONS

(75) Inventor: In-Young Chung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 144 days.

(21) Appl. No.: 10/815,695

(22) Filed: Apr. 2, 2004

(65) Prior Publication Data

US 2004/0196078 A1    Oct. 7, 2004

(30) Foreign Application Priority Data

Apr. 3, 2003    (KR)  ................. 10-2003-0021115

(51) Int. Cl.
  *H03B 1/00*    (2006.01)
  *H03K 3/00*    (2006.01)
(52) U.S. Cl. .................................... 327/108
(58) Field of Classification Search ................ 327/108, 327/112; 326/85, 87; 365/203
See application file for complete search history.

(56) References Cited

U.S. PATENT DOCUMENTS

| | | | |
|---|---|---|---|
| 6,243,302 B1 * | 6/2001 | Yoon et al. ............ | 365/189.05 |
| 6,480,044 B2 * | 11/2002 | Braun et al. ................ | 327/112 |
| 6,498,520 B1 * | 12/2002 | Yau et al. ................... | 327/108 |
| 6,879,190 B2 * | 4/2005 | Kim et al. .................. | 327/108 |

FOREIGN PATENT DOCUMENTS

| | | |
|---|---|---|
| JP | 61-157398 | 7/1987 |
| KR | 1999-002552 | 1/1999 |

OTHER PUBLICATIONS

Notice from Korean Patent Office dated Jun. 27, 2005, for Application No. 10-2003-0021115 and English Translation.

* cited by examiner

*Primary Examiner*—My-Trang Nu Ton
(74) *Attorney, Agent, or Firm*—Harness, Dickey & Pierce, P.L.C.

(57) ABSTRACT

Systems and methods for decreasing transmission timing variations include precharging a data channel at a level before data is sent over the channel. The driver sets the level in response to the reception of a precharging control signal.

22 Claims, 7 Drawing Sheets

CONVENTIONAL ART

Fig. 1

CONVENTIONAL ART

Fig. 2A

CONVENTIONAL ART

Fig. 2B

CONVENTIONAL ART

METHODS AND SYSTEMS FOR DECREASING TRANSMISSION TIMING VARIATIONS

CROSS-REFERENCE TO RELATED APPLICATIONS

This application claims the benefit of priority of Korean Patent Application No. 2003-21115, filed on Apr. 3, 2003, in the Korean Intellectual Property Office, the disclosure of which are herein incorporated by reference in their entirety by reference.

FIELD OF THE INVENTION

The present invention generally relates to the transmission of data between semiconductor devices, and more particularly, to the transmission of data by a data transmission system.

BACKGROUND OF THE INVENTION

In systems that transmit and receive (e.g., transceivers) data at high rates (or high bandwidths), both the speed at which data is transmitted or received and the reliability and stability of such data may be important.

In data transmission systems that use system clocks for control and high-speed operations, data or control signals may be synchronized to a system clock or be transmitted within a desired time frame based on the system clock. However, the time at which signals are transmitted may vary due to noise, circuit mismatches or inconsistent data patterns.

As the timing variations deteriorate, an effective data window may become narrower. This may make it more difficult to accurately receive data. That is, a receiver's ability to ensure that data is correctly received may be reduced. Moreover, such a problem may be more pronounced in systems where data is transmitted at a high-rate of speed.

For example, in a transceiving system operating in a current mode that includes a rambus DRAM (RDRAM), a data bit which is transmitted first (a signal bit transmitted first after a long waiting state) may exhibit a larger timing variation because an efficient set up time may not be guaranteed with respect to the first bit under the condition of reducing the system latency. Generally, if data cannot be read, a logic state "0" is assigned. The result being, for example, that a data pattern becomes unreliable when the first data bit indicating "1" is read instead as a "0".

Figure 1:
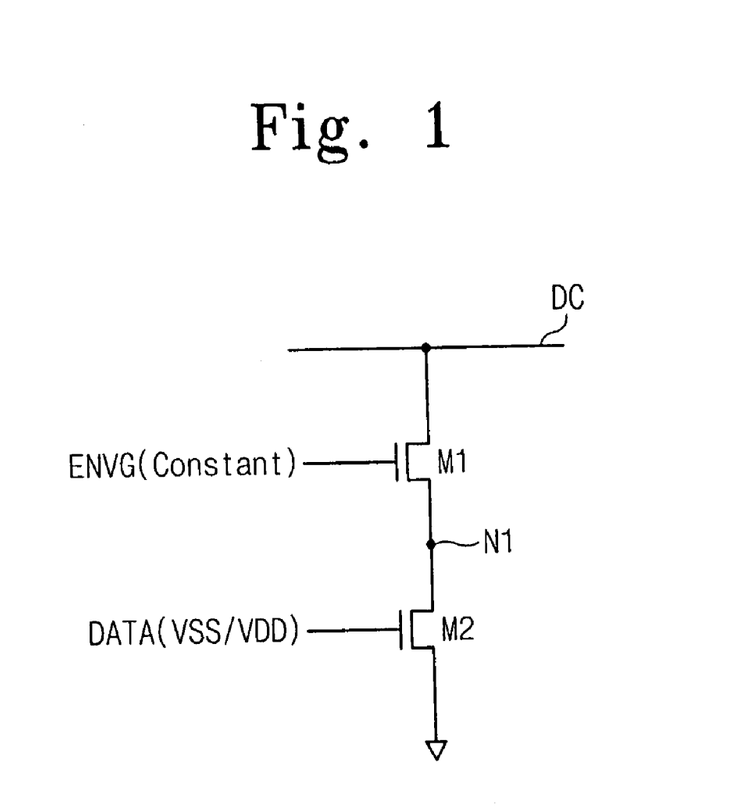
FIG. 1 depicts a circuit diagram showing a conventional mode driver employed in a data signaling system.
Figure 2A:
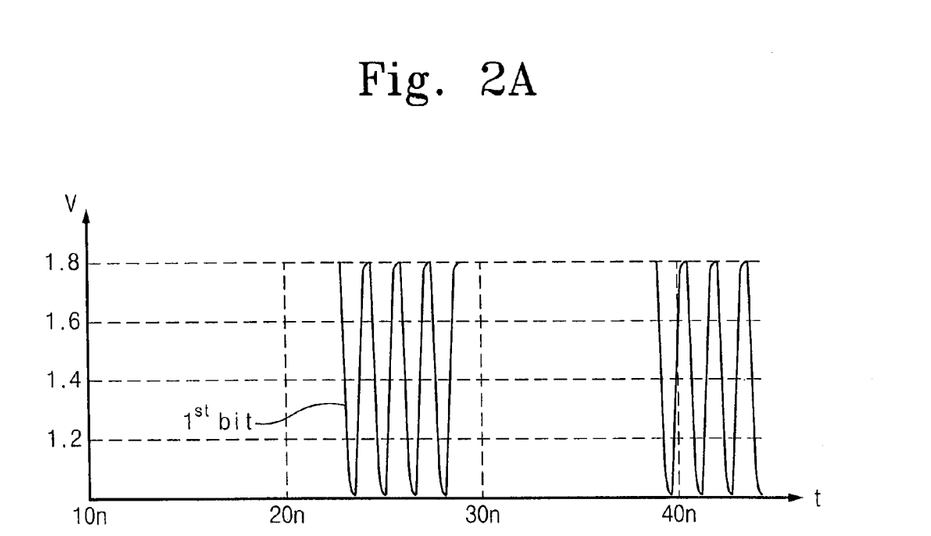
FIGS. 2A and 2B depict graphs showing conventional transmit timing patterns of a first data bit and subsequent data bits.

Other problems may also occur related to individual circuits. FIG. 1 illustrates an output driver 1 operating in a current mode of an RDRAM. A signal ENVG 2 applied to a gate of output transistor M1 has settled at a specific voltage before the data bit DATA 3 shown in FIG. 2A is applied to a gate of output transistor M2. Thereafter, data is output to a data channel (DC) 4 in response to a logic state (e.g., "0" or "1") of the data bit DATA 3. Sometimes, however, data may be output before the signal ENVG has had a chance to stably settle at a specific voltage. This may lead to data transmission timing variations and errors.

Figure 2B:
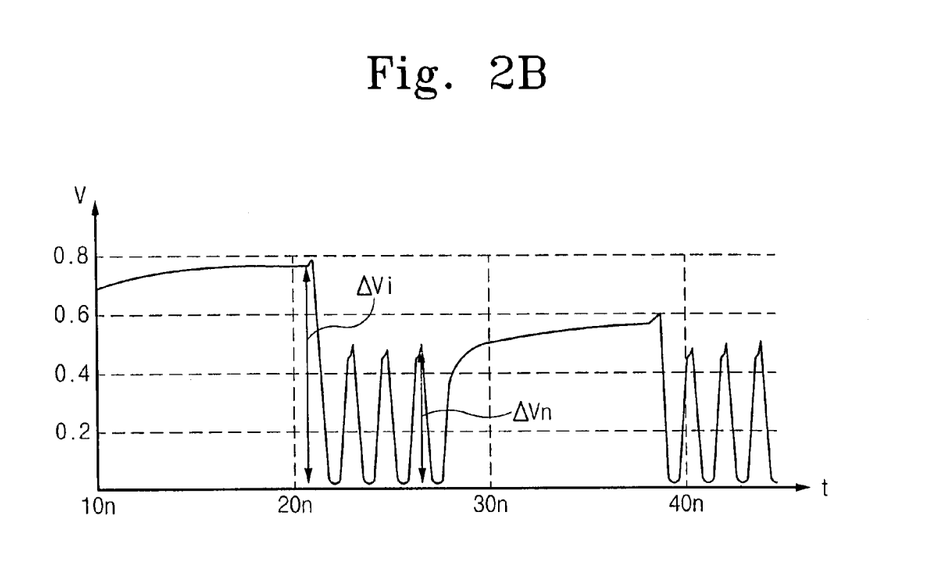

Further, node N1 between the output transistors M1 and M2 may be precharged to reduce channel noise. In conventional systems, a precharge voltage may be coupled with the voltage associated with a first data bit output from transistor M2. The first data bit has the highest voltage $\Delta Vi$ (the other data bit is $\Delta Vn$), as shown in FIG. 2B, such that the timing is deteriorated.

Figure 3:
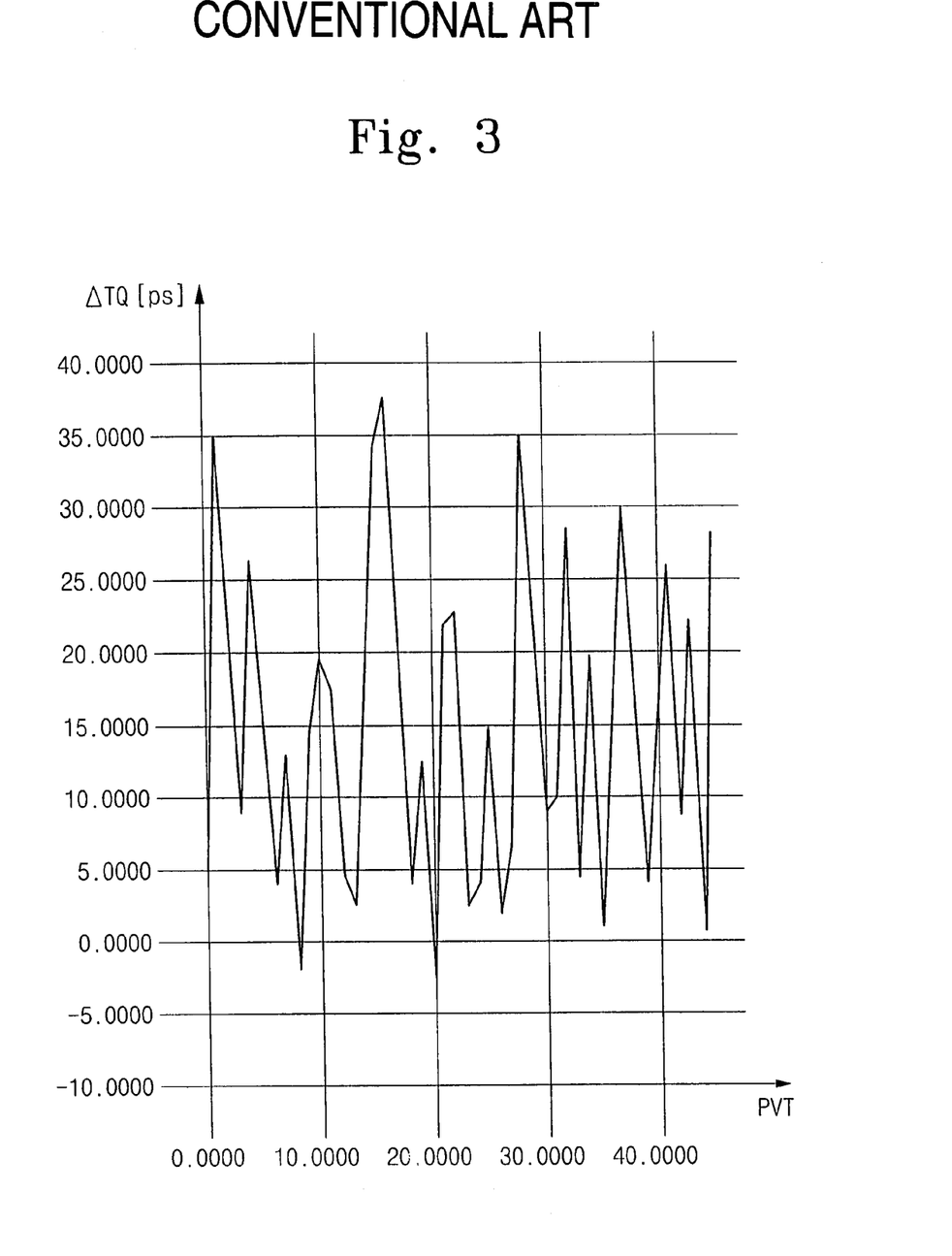
FIG. 3 depicts a graph showing differences in conventional transmit timing values between a first data bit and subsequent data bits.

FIG. 3 illustrates differences in a timing variation, $\Delta TQ$, between the first data bit and subsequent data bits under specific process, voltage and temperature conditions. The timing variation, $\Delta TQ$, shows an irregular distribution over the range of 0-36 pico-seconds (ps).

SUMMARY OF THE INVENTION

Exemplary embodiments of the present invention provide systems and methods for controlling the output of data to correct timing variations and/or errors.

An exemplary embodiment of the present invention includes a device that substantially decreases data instabilities related to transmission timing errors of a first data bit in a high speed, data transmission system.

In another exemplary embodiment of the present invention, a transceiving system includes: a gate circuit for inputting a precharging control signal and for generating an output driving signal in response to the control signal before a data bit is input and an output driver connected to a data channel, the driver responsive to the output driving signal to precharge the data channel to a voltage level before the data bit is input, thereby substantially decreasing any output timing variations of the first data bit. The precharging control signal may be enabled during a time period before the data bit is initially input.

In yet another exemplary embodiment of the present invention, the time period during which the precharging control signal may be enabled comprises a range of at least half a clock cycle to a full clock cycle before the data bit is input.

In a further embodiment of the present invention, the gate circuit does not generate the output driving signal upon receiving a power down signal associated with a power down logic state.

In yet a further exemplary embodiment of the present invention, a system for decreasing transmission timing variations includes: an N−1 first gate circuit for inputting associated data bits and generating a first output driving signal in response to a first clock signal; an N−1 output driver connected to a data channel and responsive to the first output driving signal; an NTH gate circuit for inputting associated data bits and generating a second output driving signal in response to a second clock signal; and an NTH output driver connected to the data channel and responsive to the second output driving signal, wherein the second output driver is further responsive to a precharging control signal to precharge a data channel to a specific voltage level before a first data bit is input.

In additional exemplary embodiments of the present invention, a method for decreasing transmission timing variations includes: inputting a precharging control signal; generating an output driving signal in response to the control signal before a data bit is input; and precharging a data channel to a voltage level before the data bit is input using the output driving signal.

In yet a further exemplary embodiment of the present invention, a method for decreasing transmission timing variations includes: inputting associated data bits and generating an N−1 output driving signal in response to a first clock signal; inputting associated data bits and generating an NTH output driving signal in response to a second clock signal; and precharging a data channel to a specific voltage level in response to a precharging control signal before a first data bit is input.

Exemplary embodiments of the present invention may be utilized in systems where a plurality of data storage devices are synchronized to a system clock in order to transmit/receive data over a common data channel.

DETAILED DESCRIPTION OF EXEMPLARY EMBODIMENTS OF THE INVENTION

Figure 4:
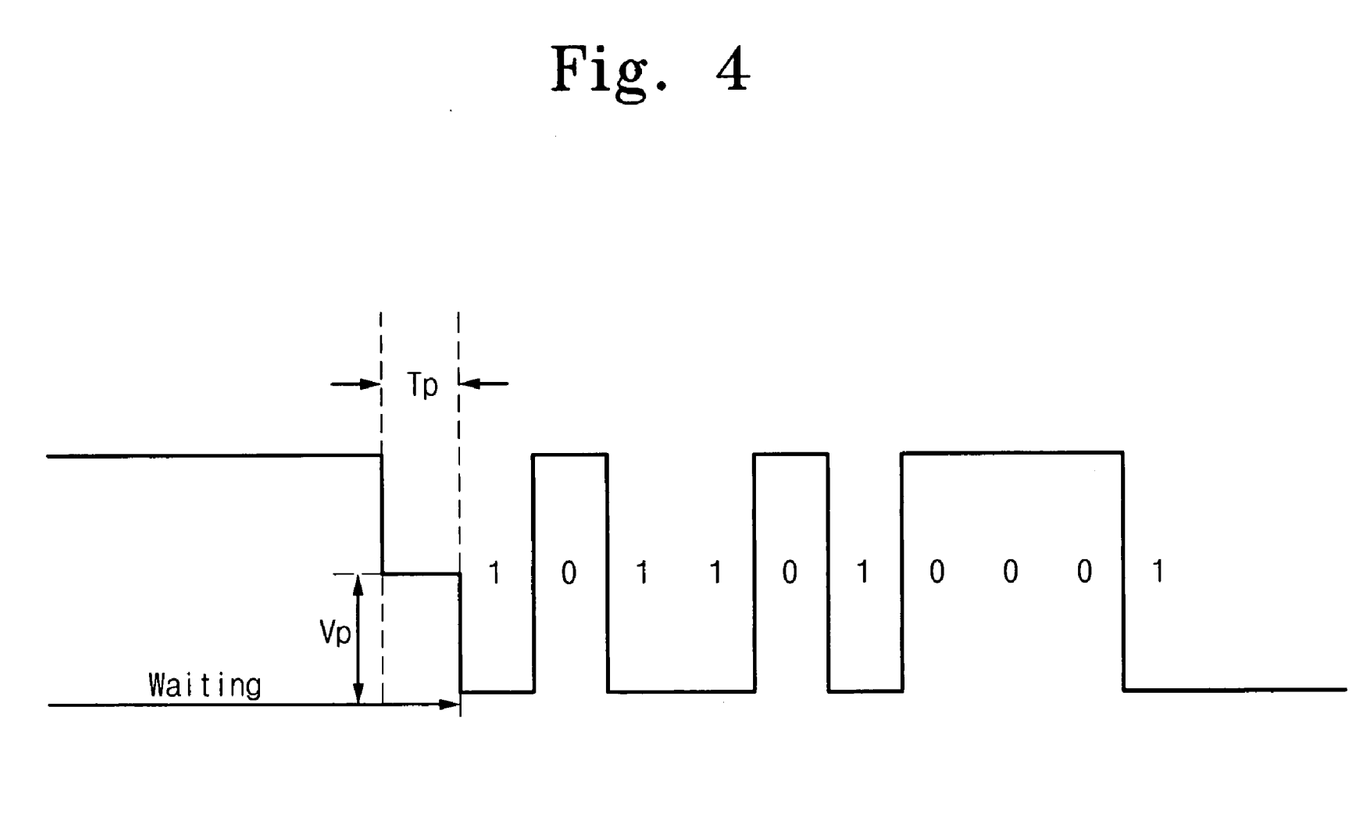
FIG. 4 depicts a logic state diagram showing a data transmission pattern where a data channel has been precharged according to an exemplary embodiment of the present invention.

FIG. 4 is a diagram showing a data transmission pattern associated with a first data bit that has been transmitted over a precharged data channel according to an exemplary embodiment of the present invention. A data channel may be precharged to a voltage level Vp during a waiting time before the first data bit is transmitted to the data channel. For example, if a power voltage is 1.8V at a high level, a precharge voltage Vp is set to approximately 1.4V.

The time for precharging the data channel may comprise one period of a system clock cycle. Precharging occurs before the first data bit is transmitted.

Therefore; even if the first data bit indicates a logic "1" or "0", the voltage swing reduces to one-second, resulting in a decrease in the transmit timing variation TQ. As a result, data transmission timing conditions may be improved in the system as a whole.

Figure 5:
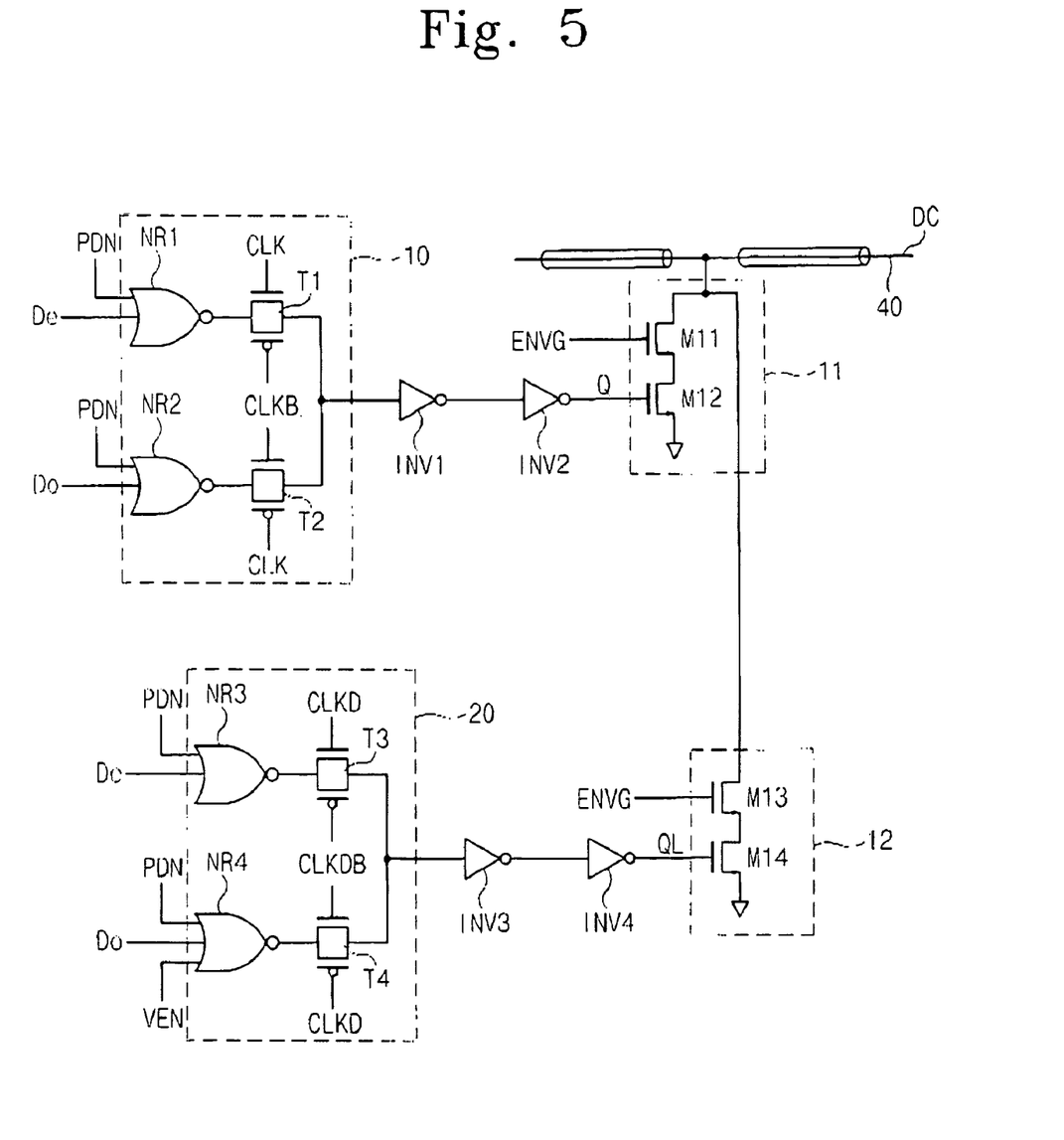
FIG. 5 depicts a circuit showing output drivers and gate circuits according to another exemplary embodiment of the present invention.

FIG. 5 is a circuit which may be included in a rambus DRAM capable of generating a transmission pattern such as the one shown in FIG. 4.

Data transmitted to a data channel DC 40 is synchronized to a system clock CLK. For example, data bit $D_e$ representing an "even" data bit and data bit $D_o$ representing an "odd" data bit are alternately transmitted and received. That is, data may be transmitted in a pipelined method. In a rambus DRAM, data may be transmitted at high speed. To reduce noise, an output driver may be divided into two drivers 11 and 12. Each driver transmits the identical data signals $D_e$ and $D_o$.

Output gate circuits 10 and 20 are connected to the output drivers 11 and 12, respectively. The output gate circuits 10 and 20 synchronize the transmission of data bit $D_e$ and data bit $D_o$ to a given clock signal. A power down signal PDN may be applied to NOR gates NR1~NR4 to control the input of data bits connected to each output gate circuit 10, 20, so that a data bit may not be transmitted while the power is removed from circuits 10, 20.

Turning now to the first output driver 11 (referred to as "first" to distinguish it from driver 12), driver 11 is operable to receive, and operate in response to, an output driving signal Q synchronized to system clock CLK input into a gate of NMOS transistor M12. Similarly, a second output driver 12 is operable to receive, and operate in response to, a delayed output driving signal QL synchronized to clock delay signal CLKD applied to a gate of NMOS transistor M14. Clock delay signal CLKD is generated based on a time delay from system clock CLK. An active signal ENVG is input into gates of NMOS transistors M11 and M13, causing transistors M11 and M13 to output a uniform or substantially uniform amount of current to data channel 40. Data (e.g., logic 1 or 0) corresponding to the continuity states of sensing transistors M12 and M14 responsive to driving signals Q and QL is output to the data channel 40 as well.

Figure 7:
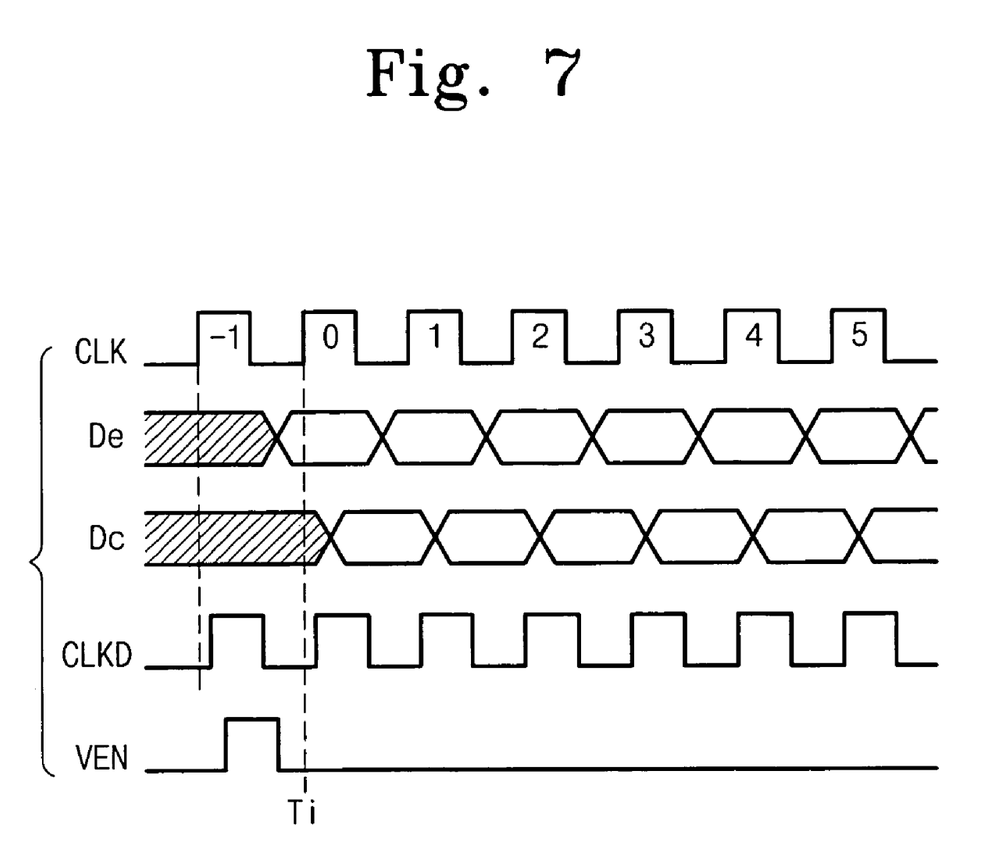
FIG. 7 depicts a timing diagram according to an exemplary embodiment of the present invention.

Driving signals Q and QL are generated by gate circuits 10, 20, respectively. For example, an even data bit $D_o$ is input through the NOR gate NR2 and passes through a transmit gate T2 when the clock signal CLK is in a low state. The even and odd data bits $D_e$ and $D_o$ are input and transmitted by way of a pipelined method, using a constant time interval as illustrated in FIG. 7. Data bits passing through the transfer gates T1 or T2 are applied to the gate of the NMOS transistor M12 as output driving signal Q via inverters INV1 and INV2. In the exemplary embodiment shown in FIG. 7, the precharge control signal VEN may be active (for example, as a short pulse) when a power down signal PDN is inactive at least before a first data bit arrives at the data channel 40. In other exemplary embodiments, the precharge control signal VEN may more generally be enabled 0.5 to 1.0 clock cycles before the next pulse of a clock signal, such as clock signal CLK.

The operation of gate circuit 20, though similar to circuit 10 in some respects, need not be identical to circuit 10. For example, an even data bit $D_e$ input through the NOR gate NR3 may pass through a transfer gate T3 when the clock delay signal CLKD is high, while an odd data bit $D_o$ input through an NOR gate NR4 may pass through a transfer gate T4 when the clock delay signal CLKD is low. The even data bit $D_e$ and odd data bit $D_o$ are input and transmitted using a constant time interval as illustrated in FIG. 7. Data bits passing through the transfer gates T3 or T4 are applied to a gate of the NMOS transistor M14 as delayed output driving signal QL via inverters INV3 and INV4. The output driving signals Q and QL are synchronized to the clock signals CLK and CLKD, respectively, and are driven after a time period substantially equal to the time difference between the clock signals CLK and CLKD. Therefore, noise due to the signal transitions may be scattered. Both gate circuits 10, 20 also receive a power down mode signal PDN.

However, gate circuit 20 receives an additional signal, precharging control signal VEN. In one exemplary embodiment of the present invention, signal PDN, odd data bit $D_o$, and control signal VEN are input into the NOR gate NR4 of the output gate circuit 20. These signals are used to generate output driving signal QL (along with inverters INV3 and INV4) to precharge circuit 12 and data channel 40.

Figure 6:
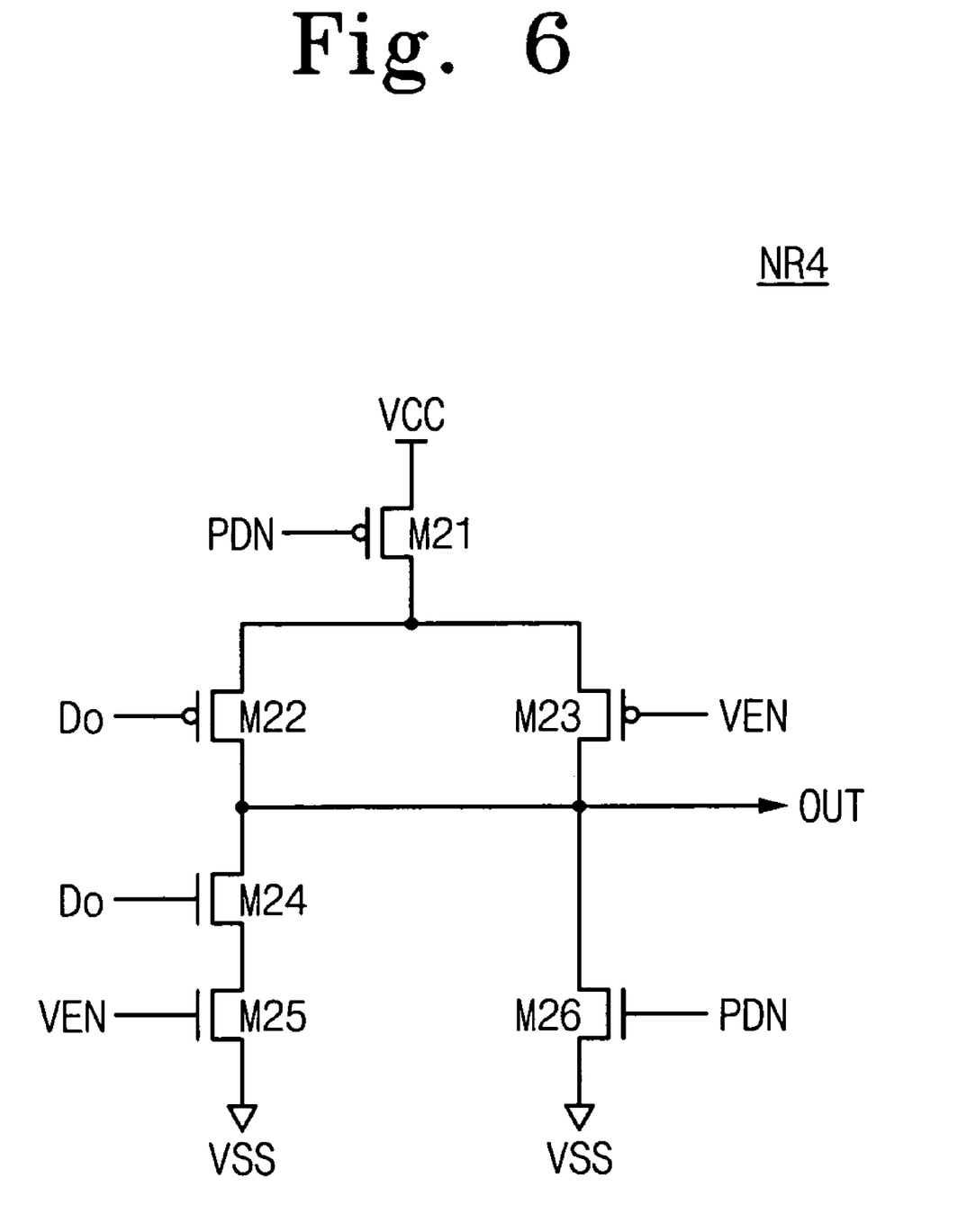
FIG. 6 depicts a circuit showing details of an NOR gate included in one of the gate circuits depicted in FIG. 5 according to yet another exemplary embodiment of the present invention.

In an exemplary embodiment of the present invention, the NOR gate NR4 may be implemented as shown in FIG. 6. This design differs from a typical 2-input type NOR gate. As shown, the NOR gate NR4 includes a PMOS transistor M21; and NMOS transistor M26 operating in response to a power down signal PDN; a PMOS transistor M22; an NMOS transistor M24 operating in response to odd data bit $D_o$; a PMOS transistor M23; and an NMOS transistor M25 operating in response to the precharge signal VEN. A source of PMOS transistor M21 is connected to a power voltage VCC. The PMOS transistors M22 and M23 are connected in parallel between a drain of the PMOS transistor M21 and an output node OUT which the NMOS transistors M24 and M25 are connected serially between the output node OUT and a ground voltage VSS. The NMOS transistor M26 is connected between the output node OUT and the ground voltage VSS.

Table 1 is a truth table which shows the logic states of the output node OUT based on the logic states of signals PDN, $D_o$ and VEN input into the NOR gate NR4 of FIG. 6.

TABLE 1

| PDN | $D_o$ | VEN | OUT |
|-----|-------|-----|-----|
| 0 | 0 | 0 | 1 |
| 0 | 0 | 1 | 1 |
| 0 | 1 | 0 | 1 |
| 0 | 1 | 1 | 0 |
| 1 | X | X | 0 |

As illustrated by the circuit in FIG. 6 and Table 1, the logic state of the output node OUT always indicates "0" regardless of the states of data bit $D_o$ and precharging signal VEN when the power down signal PDN is at a logic state "1" (i.e., during a power down mode). Under these conditions, the output driver does not operate. In comparison, when the power down signal PDN indicates "0" (i.e., not in the power down mode), and the data bit $D_o$ or precharge signal VEN indicates "0" the logic state of the output node OUT indicates "1" all the time. The logic state of the output node OUT indicates "0" when the power down signal PDN indicates "0" and both the data bit $D_o$ and the precharge signal VEN indicate "1".

The precharge signal VEN is enabled from a time $T_i$, when a first data bit is transmitted, to 0.5 to 1.0 clock cycles before the next pulse of the clock signal CLK, and maintains a logic state "1" during one clock cycle.

That is to say, when the precharging control signal VEN equals a logic "1" and the power down signal PDN equals a logic "0" before the first data bit (for example, $D_e$) is received (before the time $T_i$), a current is supplied to the output node OUT from the power voltage VDD through the PMOS transistors M21 and M23. As the clock delay signal CLKD reaches a low level, an output current associated with a high level passes through a transmit gate T4 and inverters INV3 and INV4 as output driving signal QL to a gate of the NMOS transistor M14. As a result, a channel current is created in the NMOS transistor M14, causing the voltage data channel DC 40 to decrease.

According to other exemplary embodiments of the present invention, a precharge voltage of substantially 1.4V may be generated if the power voltage is 1.8V. While the precharge signal VEN maintains a logic "1", the channel current of the NMOS transistor M14 causes the voltage of the data channel DC to decrease to about 1.4V near time $T_i$. The precharge signal VEN may then be disabled (e.g., set to a logic "0") and synchronized to the clock signal CLK after the even data bit $D_e$ is input and before the data bit $D_o$ is input. In this manner, the data bits may be serially input.

Precharging data channel 40 may limit the voltage swing in the output driver to about 0.4V because the first bit rises or falls from an initial precharge voltage of 1.4V whether the first bit (e.g., $D_e$) indicates "1" or "0". Referring to FIG. 3, the transfer timing variation TQ of the first data bit decreases, such that a TQ improvement of 25~35 ps can be realized.

While exemplary embodiments of the invention have been described with reference to specific embodiments, the description is illustrative of the invention and is not to be considered as limiting the invention. Various modifications and applications may occur to those skilled in the art without departing from the true spirit and scope of the invention as defined by the appended claims. For instance, the time or interval at which the signal VEN is enabled can be set according to the transmission timing of an entire data pipeline. In addition, the amount of driving current can also be adjusted.

Exemplary embodiments of the present invention reduces transmission timing variations of the first bit of a high-data rate system, thereby improving the reliability and stability of received data. It should be understood that the gate circuits, output driving circuits and NOR gate shown in FIGS. 5 and 6 are only exemplary circuits. Other equivalent circuits may be designed by one of ordinary skill in the art without departing from the spirit and scope of the present invention. Similarly, the timing diagram shown in FIG. 7 is also exemplary. One of ordinary skill in the art may substitute other timing diagrams without departing from the spirit and scope of the present invention. For example, a logic 1 may be substituted for a logic 0 and vice versa for one or all of the signals shown in FIG. 7.

It also should be understood that precharging may occur before input into a gate circuit or circuits, before input to an output driver or drivers, and/or before transmission to a data channel or channels. Also, the gate circuit or circuits, the output driver or drivers, and/or the data channel or channels may be located on the same chip, substrate, or board or different chips, substrates, or boards.

It also should be understood that any number of precharge enable signals VEN, gate circuit or circuits, output driver or drivers, and/or data channel or channels may be used in combination.

In addition, the discussion above has mentioned a DRAM as a system which may include features and functions of the present invention. Other RAMs or memory devices may also include such features and functions without departing from the spirit and scope of the present invention.

What is claimed is:

1. A system for decreasing transmission timing variations comprising:
   a gate circuit for inputting a precharging control signal and for generating an output driving signal in response to the precharging control signal before a data bit is input; and
   an output driver connected to a data channel and responsive to the output driving signal for precharging the data channel to a voltage level before the data bit is input.

2. The system of claim 1, wherein the precharging control signal is enabled during a time period before the data bit is input.

3. The system as in claim 2, wherein the time period comprises a range of at least half a clock cycle to a full clock cycle.

4. The system of claim 1, wherein the gate circuit does not generate the output driving signal upon receiving a power down signal associated with a power down logic state.

5. The system of claim 1, wherein the output driver includes first and second transistors connected serially between the data channel and a ground voltage.

6. The system of claim 5, wherein the first transistor responds to an active signal having a voltage level before the data bit is input, and the second transistor is responsive to the output driving signal to precharge the data channel.

7. A system for decreasing transmission timing variations comprising:
an N−1 first gate circuit for inputting associated data bits and generating a first output driving signal in response to a first clock signal;
an N−1 output driver connected to a data channel and responsive to the first output driving signal;
an NTH gate circuit for inputting the associated data bits and generating a second output driving signal in response to a second clock signal; and
an NTH output driver connected to the data channel and responsive to the second output driving signal,
wherein the NTH output driver is further responsive to a precharging control signal to precharge the data channel to a voltage level before a first data bit of the associated data bits is input.

8. The system of claim 7, wherein the precharging control signal is enabled during a time period of the first clock signal before the first data bit is input.

9. The system as in claim 8 wherein the time period comprises a range of at least half a clock cycle to a full clock cycle of the first clock.

10. The system of claim 7, wherein each of the gate circuits does not generate the respective output driving signal upon receiving a power down signal associated with a power down logic state.

11. The system of claim 7, wherein each of the output drivers includes transistors serially connected between the data channel and a ground voltage.

12. The system of claim 11, wherein one of the transistors responds to a signal having a voltage level before the first data bit is input, and the other transistor responds to the associated output driving signal.

13. A method for decreasing transmission timing variations comprising:
inputting a precharging control signal;
generating an output driving signal in response to the precharging control signal before a data bit is input; and
precharging a data channel to a voltage level before the data bit is input using the output driving signal.

14. The method of claim 13, further comprising enabling the precharging control signal during a time period before the data bit is input.

15. The method as in claim 14, wherein the time period comprises a range of at least half a clock cycle to a full clock cycle.

16. The method of claim 13, wherein the output driving signal is not generated when a power down signal associated with a power down logic state is received.

17. A method for decreasing transmission timing variations comprising:
inputting associated data bits and generating an N−1 output driving signal in response to a first clock signal;
inputting the associated data bits and generating an NTH output driving signal in response to a second clock signal; and
precharging a data channel to a voltage level in response to a precharging control signal before a first data bit of the associated data bits is input.

18. The method of claim 17, further comprising enabling the precharging control signal during a time period of the first clock signal before the first data bit is input.

19. The method of claim 18, wherein the time period comprises a range of at least a half clock cycle to a full clock cycle of the first clock.

20. The method of claim 17, wherein no output driving signals are generated upon receiving a power down signal.

21. In a system comprising a gate circuit for inputting a precharging control signal and for generating an output driving signal in response to the control signal before a data bit is input and an output driver connected to a data channel and responsive to the output driving signal for precharging the data channel to a voltage level before the data bit is input, a method for decreasing transmission timing variations comprising:
inputting the precharging control signal;
generating the output driving signal in response to the control signal before a data bit is input; and
precharging the data channel to a voltage level before the data bit is input using the output driving signal.

22. In a system comprising an N−1 gate circuit for inputting associated data bits and generating a first output driving signal in response to a first clock signal, an N−1 output driver connected to a data channel and responsive to the first output driving signal, an Nth gate circuit for inputting associated data bits and generating a second output driving signal in response to a second clock signal and an NTH output driver connected to the data channel and responsive to the second output driving signal, wherein the second output driver is further responsive to a precharging control signal to precharge the data channel to a voltage level before a first data bit is input, a method for decreasing transmission timing variations comprising:
inputting the associated data bits and generating the N−1 output driving signal in response to the first clock signal;
inputting the associated data bits and generating the NTH output driving signal in response to the second clock signal; and
precharging the data channel to the voltage level in response to the precharging control signal before the first data bit is input.

* * * * *